July 14, 1959     D. R. DAVIS     2,894,768
PIPE COUPLING HAVING A RADIALLY EXPANSIBLE POSITIVE LOCK
Filed April 5, 1956
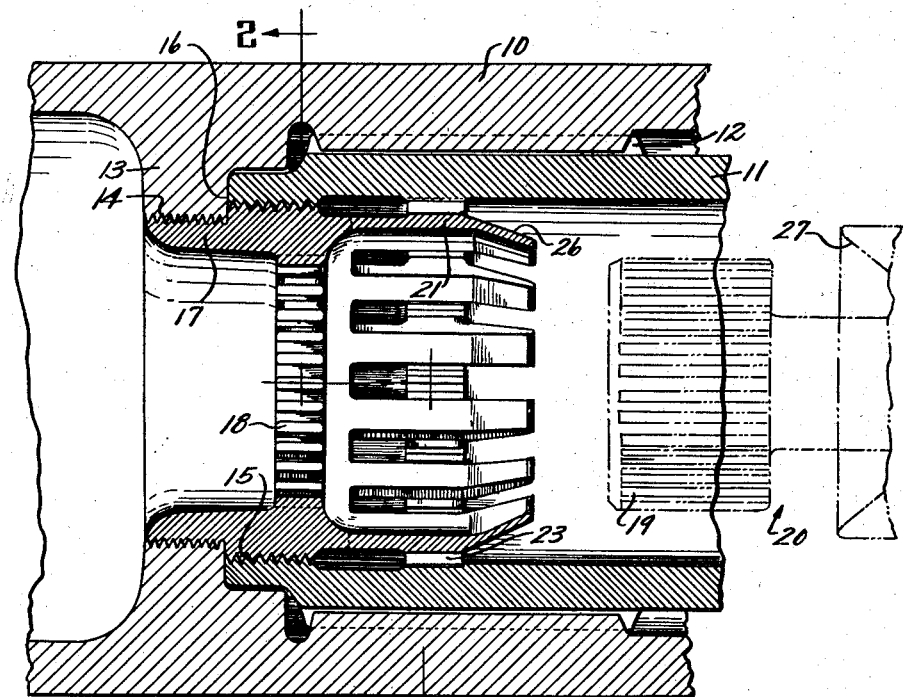
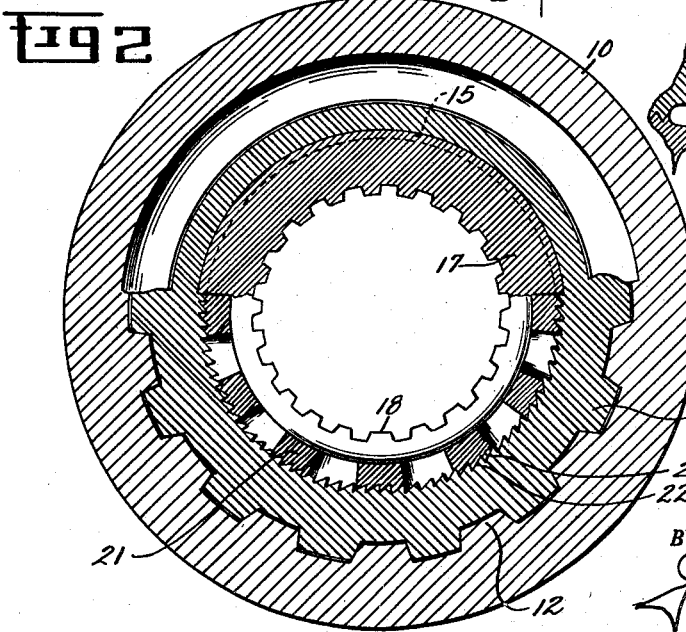
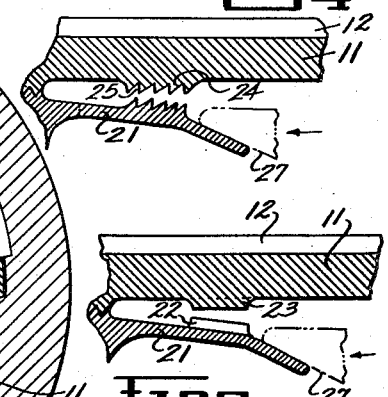
INVENTOR.
DAVID R. DAVIS
BY
*John F. Cullen*
HIS ATTORNEY—

United States Patent Office 2,894,768
Patented July 14, 1959

2,894,768
PIPE COUPLING HAVING A RADIALLY EXPANSIBLE POSITIVE LOCK

David Robert Davis, Hamilton, Ohio, assignor to General Electric Company, a corporation of New York Application April 5, 1956, Serial No. 576,468

2 Claims. (Cl. 285—39)

The present invention relates to a coupling and, more particularly, to an internal coupling designed to secure long tubular members together where access to the coupling is obtained through the tubular members.

In many applications, it is necessary to secure tubular members together and the nature of the application is such that an external coupling is not feasible. In such applications, an internal coupling must be used and access to the joint between the members to be secured can be had only through the tubular members. In many cases, the distance through the tubular members can be quite large. As a result, the coupling must be easily installed and held securely, and easily removed if it is to serve a useful purpose.

Accordingly, the main object of the present invention is to disclose an internal coupling means securely fastening together tubular members where access to the joint may be had only through the interior of the tubular members.

Another object of the invention is to disclose such a coupling means that insures a tight connection between the members when the members are subjected to vibrating and/or rotating motion.

A further object is to disclose such an internal coupling which is locked against rotation and may be easily installed and removed through a long section of a tubular member by means of a suitable tool.

Briefly stated, in accordance with one aspect of my invention, I provide different internal threads on each tubular member. One of the tubular members is insertable within the other and the threads are engaged by an externally threaded sleeve which is rotatable by suitable means to differentially thread the parts together. The sleeve is provided with longitudinally extended resilient fingers having locked means engageable with the inner surface of a tubular member to resist rotation of the sleeve. In addition, the fingers are equipped with camming surfaces which may be engaged by a suitable tool to cam the fingers radially inwardly to disengage the locking means so the sleeve may be rotated to break the coupling.

My invention will be better understood from the following description taken in connection with the accompanying drawing and its scope will be pointed out in the appended claims.

In the drawing:

Figure 1 is a partial cross-sectional view through a pair of joined tubular members illustrating the coupling and a tool in phantom for operation of the coupling;

Figure 2 is a cross-sectional view taken on line 2—2 of Figure 1;

Figure 3 is a partial cross-sectional view illustrating one form of locking finger; and Figure 4 is a view similar to Figure 3 showing a modified form of locking finger.

Referring first to Figure 1, there is partially shown a pair of tubes 10 and 11 that are to be coupled together wherein access may be had only through the interior of the tubes. As can be seen from the drawing, tube 11 is concentric with tube 10 and arranged for insertion therein. In order to prevent rotation of the tubes relative to one another, suitable spline means 12 may be provided between the inner and outer surfaces of tubes 10 and 11, respectively. It is, of course, immaterial on which member the key and keyway are formed.

In order to prevent axial motion in one direction, an inwardly directed shoulder 13 is preferably provided on the inner surface of tube 10. The inner surface of shoulder 13 is threaded as at 14 for a purpose to be described. The inner surface of tube 11 is also threaded as at 15 and, it is to be noted, that threads 15 differ from threads 14 so that a differential threading action may be provided. The different threading arrangement preferably includes threads of the same hand with different pitches. However, if assembly of sleeve 17 can be made in the tube 10 prior to the insertion of tube 11 therein, the threads may be of different hand. Tube 11 has at least part of its walls at a larger radial distance than the inner radius of shoulder 13 to permit abutting engagement at surface 16 to limit axial movement in one direction.

In order to draw the tubes together in a tight fitting position, I provide a sleeve 17 with external threaded sections to match threads 14 and 15. Sleeve 17, as shown, may be placed in position through tube 11 from a remote point. Obviously, it may be insertable through tube 10 by minor modification, such as placing the threads 14 and 15 in the reverse radial spacing from that shown. In order to rotate the sleeve and draw tubes 10 and 11 together into tight abutting relation with shoulder 13 at surface 16, means, such as spline 18 or any suitable equivalent, are provided on the inner surface of sleeve 17. It can be seen that spline 18 is engageable by a suitable mating surface 19 on a long handled tool, generally indicated at 20, which may be inserted at the remote end of tube 11 and engaged with sleeve 17 to turn the sleeve and secure the tubes together.

If the tubes are in a rotating or vibrating environment, sleeve 17 is prone to work loose. This is prevented in the instant invention by an effective locking mechanism. A plurality of longitudinally extending fingers 21 extend into one of the tubular members, such as tube 11. Fingers 21 are resilient as is shown by the cantilever connection with sleeve 17. The outer surface of fingers 21 carries a locking means such as longitudinal keys 22 as shown in Figure 3, which are engageable with matching keyways 23 on the inner surface of tube 11. By the cantilever construction, fingers 21 are biased into the spline engagement with tube 11 to prevent rotation of sleeve 17 therein. The locking means between the fingers and the tube may take various modifications, for example, that shown in Figure 4 wherein a ratchet arrangement 24 is shown having friction surfaces 25 to resist rotation of sleeve 17.

In order to provide for rapid disassembly from a remote point by tool 20, fingers 21 are provided with a cam surface 26 which may be engaged by a mating surface 27 on tool 20. The resiliency of fingers 21 permits them to be cammed radially inwardly by surface 27 to disengage the locking means.

In operation, tube 11 is inserted into tube 10 and held against rotation therein by spline means 12. Sleeve 17 is mounted on tool 20 and inserted from the remote end of tube 11 to engage threads 14 and 15 on the respective tubes. It is to be noted that on contact of the threads when the inward motion of sleeve 17 is resisted, further pressure cams fingers 21 inwardly to permit the free threading of sleeve 17 into tubes 10 and 11. The differential threading arrangement permits the tubes to be drawn tightly together by rotation of sleeve 17 through the engagement of spline 18 with mating surface 19 until the tubes are tightly together in abutting relation at surface 16. Withdrawal of the tool 20 permits fingers 21 to spring into locking engagement with the keyway 23 on the inner surface of tube 11. Thus assembled, the coupling is secure against working loose due to vibratory or rotating action.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent is:

1. Coupling means for longitudinally extending tubular members comprising, a first internally threaded circular tubular member, a second internally differently threaded tubular member disposed concentrically within said first member, means between said members locking said members against rotation relative to one another, a sleeve within said members having external threaded sections matching said tubular threads and in engagement therewith, means on the inner surface of said sleeve member to impart rotation thereto to draw said differentially threaded members into tight engagement thereon, a plurality of narrow longitudinally extending cantilevered flexible fingers carried by said sleeve and extending within one of said members, said fingers being spaced in close relation about the entire periphery of the sleeve, locking means carried by said fingers on the outer surface thereof, internal locking means on said one member in engagement with said finger locking means to hold said sleeve against rotation, and cam means on said fingers to force said fingers radially inwardly to disengage said locking means.

2. Coupling means for tubular members comprising, a first circular tubular member, an inwardly directed shoulder thereon, screw threads on the inner surface of said shoulder, a second internally differently threaded tubular member disposed concentrically within said first member and having a radius larger than the radius of the internal surface of said shoulder for abutment thereagainst, longitudinal spline means between said members locking said members against rotation relative to one another, a sleeve within said members having external threaded sections matching said tubular threads and in engagement therewith, means on the inner surface of said sleeve member to impart rotation thereto to draw said differentially threaded members into tight engagement thereon into abutting relation at said shoulder, a plurality of narrow peripherally arranged longitudinally extending cantilevered flexible fingers carried by said sleeve and extending within said second member, said fingers being spaced in close relation about the entire periphery of the sleeve, locking means carried by said fingers on the outer surface thereof, internal locking means on said second member in engagement with said finger locking means to hold said sleeve against rotation, and cam means on said fingers operative to force said fingers radially inwardly to disengage said locking means.

References Cited in the file of this patent

UNITED STATES PATENTS

| | | |
|---|---|---|
| 622,764 | Ford | Apr. 11, 1899 |
| 800,802 | Franquist | Oct. 3, 1905 |
| 1,062,830 | Knoop | May 27, 1913 |
| 1,128,997 | Morden | Feb. 16, 1915 |
| 1,165,838 | Brill | Dec. 28, 1915 |
| 1,611,408 | Bowers | Dec. 21, 1926 |
| 1,824,257 | Bull | Sept. 22, 1931 |
| 2,047,241 | Wittel | July 14, 1936 |
| 2,118,350 | Holt | May 24, 1938 |
| 2,601,651 | Wandy | June 24, 1952 |
| 2,834,390 | Stevens | May 13, 1958 |

FOREIGN PATENTS

| | | |
|---|---|---|
| 837,543 | France | Nov. 12, 1938 |
| 497,675 | Great Britain | Dec. 23, 1938 |